Patented July 21, 1953

2,646,428

UNITED STATES PATENT OFFICE 2,646,428

RUTIN DERIVATIVES AND PRODUCTION THEREOF

Pierre Chabrier, Paris, Pierre R. L. Giudicelli, Fontenay-sous-Bois, and Charles H. Génot, Paris, France, asssignors to Les Laboratoires Dausse (Societe Anonyme), Paris, France, a company of France No Drawing. Application September 11, 1950, Serial No. 184,348. In France September 20, 1949

4 Claims. (Cl. 260—210)

1

Rutin or rutoside having the following formula

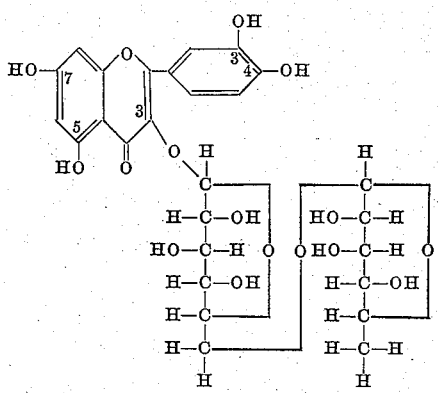

and which is a glucorhamnoside of quercetol or 3.5.7.3'.4'-pentahydroxy-flavone, is a therapeutically useful compound, particularly in view of its action on capillary fragility. Rutin has the disadvantage of being very sparingly soluble in water (0.5% in boiling water and 0.013% in cold water) so that for employing the same, it has been necessary either to administer it through digestive way where the effects thereof are less positive or to inject solutions of rutin in solvents thereof which have a proper activity and a proper toxicity capable, more often than not, to interfere with the effect of rutin.

By reason of the presence of four phenolic hydroxy groups in its molecule, rutin can be solubilized in water by means of an alkali but the solutions thus obtained have a great propensity to oxidation, being rapidly altered into a brown liquid from which in the long run rutin can no longer be regenerated.

Acetyl derivatives of rutin are also known but they are insoluble in water.

It is a primary object of this invention to provide new derivatives of flavonol glucidic compounds, particularly rutin derivatives, which are first of all much more readily soluble in water than rutin itself.

Further objects will become apparent as the specification proceeds.

According to this invention we provide new derivatives of flavonol glucidic compounds, particularly of rutin, viz tertiary amino alkyl ethers of said compounds, more particularly mono β-tertiary-amino ethyl ethers of rutin.

Amongst such ethers, two are particularly desidable, viz a β-diethylamino ethyl ether and a β-morpholinyl ether. Both are soluble in water in any proportion and can thus be injected in the form of relatively concentrated (10% by weight or more) aqueous solutions thereof; moreover while producing the same effects as rutin, they are distinguished by complete absence of toxicity at therapeutic doses. Furthermore they are soluble in alcohol and acetone.

This invention also comprises a process for the production of said phenolic ethers or process for solubilizing rutin, wherein rutin is reacted in aqueous, preferably alkalinized, medium, with a tertiary amino alkyl halide or a hydrohalide of said halide, the reaction being preferably effected in the absence of oxygen.

This invention still further comprises salts of the tertiary amino, phenolic ethers above referred to, particularly hydrochlorides, phosphates and benzoates, all of which are very readily soluble in water.

For producing such salts, the acid may be reacted directly with the ether in calculated proportion either in water or another suitable solvent such as alcohol. Where the salts thus produced are not precipitated, they may be isolated by evaporating or atomizing the reaction product. Alternatively the salts may be produced by effecting a double decomposition in an aqueous, alcoholic or other medium, for example between the hydrochloride of the ether and a salt of the selected acid, which is soluble in said medium.

The following examples which are not limiting are illustrative of this invention and the manner of carrying the same into effect.

Example 1

20 parts by weight of rutin were suspended in a solution of 8.3 parts by weight of hydrochloride of β-diethylamino ethyl chloride in 50 parts by weight of water, then a solution of 3.4 parts by weight of sodium hydroxide or the equivalent amount of another alkali in 150 parts by weight of water were gradually stirred into the suspension. The mixture was stirred, care being taken to prevent access of air so as to avoid oxidation of rutin, whereupon the whole substances passed into solution. At the very most a slight residue of rutin impurities occurred, which was removed for example by filtering it off.

The solution was then heated on a water bath for about an hour and a half, then water was driven off by evaporating to dryness in a vacuo or through atomization. The residue was taken up in boiling alcohol which dissolved the mono β-diethylamino ethyl ether of rutin and separated the same from sodium chloride produced.

Upon evaporation of the alcoholic solution a golden yellow powder melting at about 170° C. and very readily soluble in water was obtained with a yield of 40–50 per cent.

*Example 2*

The procedure was the same as in Example 1 but hydrochloride of β-morpholinyl ethyl chloride was substituted for hydrochloride of β-diethylamino ethyl chloride, the molecular weight thereof being accounted for.

The mono β-morpholinyl ethyl ether of rutin was isolated likewise; it had a melting point of about 135° C. and it was obtained with a yield of 35–40 per cent.

What we claim is:

1. A mono β-morpholinyl ethyl ether of rutin.
2. A therapeutic product which is an aqueous solution of a mono β-morpholinyl ethyl ether of rutin.
3. A process for the production of a water-soluble rutin derivative, which comprises reacting rutin with a substantially equimolar amount of a β-morpholinyl ethyl halide in an alkalinized aqueous medium with substantial exclusion of free oxygen.
4. The process of claim 3, said halide being in the form of a hydrohalide thereof.

PIERRE CHABRIER.
PIERRE R. L. GIUDICELLI.
CHARLES H. GÉNOT.

References Cited in the file of this patent

UNITED STATES PATENTS

| Number | Name | Date |
|---|---|---|
| 2,290,880 | Katzman et al. | July 28, 1942 |
| 2,451,772 | Plungian | Oct. 19, 1948 |
| 2,445,949 | Rieveschl et al. | Dec. 14, 1948 |
| 2,508,499 | Cusic | May 23, 1950 |